United States Patent Office 3,478,016
Patented Nov. 11, 1969

3,478,016
PREPARATION OF CELLULOSE ESTER AND ETHER SULFATES WITH LOW INORGANIC SALT CONTENT
Martin E. Rowley, Rochester, N.Y., assignor to Eastman Kodak Company, Rochester, N.Y., a corporation of New Jersey
No Drawing. Continuation-in-part of application Ser. No. 479,668, Aug. 13, 1965, which is a continuation-in-part of application Ser. No. 128,976, Aug. 3, 1961, which in turn is a continuation-in-part of application Ser. No. 56,347, Sept. 16, 1960. This application July 26, 1967, Ser. No. 656,068
Int. Cl. C08b 5/14, 11/02; C09j 3/04
U.S. Cl. 260—215
8 Claims

ABSTRACT OF THE DISCLOSURE

A method of recovering cellulose ether or ester sulfates from their reaction media substantially free of inorganic salt has been developed. The method involves the precipitation of the product in isopropanol. It was discovered that by adding substantially anhydrous isporopanol at the outset of the precipitation step, in an amount at least equimolar to the amount of alkali metal salt of acyl sulfuric acid present at that time in the reaction medium (provided that the reaction medium is anhydrous during this addition of anhydrous isopropanol), a product substantially free of inorganic salt can be obtained.

---

This application is a continuation-in-part of my copending application Ser. No. 479,668, filed Aug. 13, 1965, and now abandoned, which is a continuation-in-part of application Ser. No. 128,976, filed Aug. 3, 1961, and now abandoned, which in turn is a continuation-in-part of application Ser. No. 56,347 of Hiatt and Rowley filed Sept. 16, 1960, and issued Jan. 29, 1963, as United States Patent 3,075,962.

This invention relates to the preparation of low inorganic salt content cellulose derivatives. In a specific aspect this invention relates to a method for making cellulose derivatives containing relatively small amounts of inorganic salts by separating the cellulose derivative from its reaction mass under anhydrous conditions in the presence of a considerable amount of isopropanol.

In producing sulfates of cellulose derivatives, such as cellulose acylate sulfates and cellulose ether sulfates, many of the procedures used do not employ a substantial excess of lower fatty acid anhydride, and the resulting products or their salts are insoluble in the reaction mass. The separation of the resulting cellulosic product from the reaction mass can be readily accomplished by filtering off the insoluble solid material from the liquid with which it was surrounded and washing the insoluble solid material with a suitable wash liquid which will not dissolve the product. However, in the procedure for preparing cellulose acylate sulfates or cellulose ether sulfates having a high sulfur content of 5–7% and wherein a substantial excess of lower fatty acid anhydride is employed in the esterification reaction, the sulfates formed or their salts are soluble in the reaction mass and when the cellulose product is separated from the reaction mass, the product obtained can have a content of uncombined inorganic salt of 3 to 5% or more. Concentrations of inorganic salt impurities of this magnitude in the cellulosic reaction product are highly undesirable.

One object of my invention is to provide a method of preparing cellulose acylate sulfates or ether sulfates having a low content of inorganic salt impurities. Another object of my invention is to provide in the dope method of preparing sulfates of cellulose compounds treatment with isopropanol under anhydrous conditions at the time of separating the cellulose product from the reaction mass. Other objects of my invention will appear herein.

In accordance with my invention it has been found that in a process for making cellulose acylate sulfates or cellulose ether sulfates wherein cellulose or a cellulose compound is reacted upon with a reaction mass containing fatty acid anhydride, sulfuric acid and a sodium salt under anhydrous conditions, the cellulose derivative, which is soluble in the reaction medium can be recovered substantially free or inorganic salt. Thus, in a process for producing a cellulose sulfate, such as a cellulose acylate sulfate or a cellulose ether sulfate in which anhydrous conditions are maintained, wherein the cellulose sulfate is produced in a reaction medium in which the cellulose sulfate is soluble, my invention enables the recovery of the cellulose sulfate with not substantially more than 1% by weight of inorganic salt impurity by mixing substantially anhydrous isopropanol with the reaction medium containing the cellulose sulfate, upon completion of reaction and while the reaction medium is still anhydrous. Isopropanol is used in the present processes in an amount sufficient to precipitate the cellulose sulfate. Substantially anhydrous isopropanol is used in an amount at least equimolar to alkali metal salt of acyl sulfuric acid in the reaction medium (usually formed when the cellulose sulfate is produced). The term "substantially anhydrous isopropanol" means about 98–100% isopropanol. For instance, a cellulose acetate sulfate may be prepared by reacting upon cellulose with a mixture of acetic anhydride, sulfuric acid, sodium sulfate and a weak acid catalyst, the amount of acetic anhydride used being in at least 10% excess of that which is necessary to impart an acetyl content of 25–30% to the cellulose and the sulfuric acid is employed in an amount sufficient to impart 5–7% sulfur content to the product obtained. In reacting upon 100 parts of cellulose there should be used 300 to 400 parts of acetic or other lower fatty acid anhydride, 0.2–1 mole of sulfuric acid per mole of cellulose, 1 mole of sodium sulfate per mole of sulfuric acid, and a sufficient proportion of a weak catalyst to permit the reaction. The sodium sulfate may be present as a result of the use of sulfuric acid with a sodium compound which will react therewith such as with sodium acetate. The catalyst employed may be methane sulfonic acid, sulfoacetic acid, sodium salt of acetyl sulfuric acid,

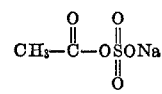

phosphoric acid, or some other weak acid catalyst recognized as being useful for the esterification of cellulose.

If a cellulose ether sulfate is being prepared, ethyl cellulose may be employed as the starting material and the material may be reacted upon by a sulfating mixture prepared by mixing sulfuric acid, acetic anhydride and sodium acetate.

I have found that after the esterification has been completed, a product having a low inorganic salt content can be separated from the reaction mass by either precipitating the material in substantially anhydrous isopropanol or by (a) incorporating in the dope an amount of substantially anhydrous isopropanol at least equimolar to the amount of alkali metal salt of acyl sulfuric acid in the reaction medium at the time the anhydrous isopropanol is blended therewith, and (b) then precipitating the cellulose sulfate from the mass in about 85% (or higher) isopropanol. The cellulose product which is in the form of its salt precipitates from the solution but contains an inorganic salt content of less than 1%.

Instead of cellulose acetate sulfate, other lower fatty acid radicals may be present along with or in place of the acetyl radical. For instance, my invention also applies in the making of cellulose propionate sulfate, cellulose acetate propionate sulfate, cellulose acetate butyrate sulfate and the like. In the case of the cellulose acetate sulfates my invention relates to the preparation of products having an acetyl content of 25–30% and a sulfur content of 5–7%. In the case of the propionyl and butyryl containing esters lesser proportions of these higher fatty acids is desirable; for instance, when propionyl is used instead of acetyl, about 19–23% apparent acetyl content, and when butyryl is used, about 15–18% apparent acetyl content are to be preferred. My invention is not limited to the sodium salts but includes alkali metal salts generally.

The following examples illustrate the preparation of low inorganic salt content sulfates of cellulose compounds in accordance with my invention:

EXAMPLE 1

A sulfating mixture was prepared by adding 11.1 lbs. of 95% sulfuric acid to a slurry of 15.3 lbs. of anhydrous sodium sulfate in 122.5 lbs. of acetic anhydride and 40.8 lbs. of acetic acid at 100° F. The mixture was checked for neutrality with crystal violet and was cooled to 100° F.

37.2 lbs. of acetylation grade wood pulp (6.3% moisture) and 75 lbs. of acetic acid were added to a 50-gallon sigma blade mixer and the mixer was run for one hour at 100° F. and was then cooled to 70° F. While the jacket temperature was kept at 20° F. 48 lbs. of sulfating mixture having a temperature of 100° F. was stirred in. When the inside temperature of the mixer had returned to 80° F., the remainder of the sulfating mixture was added. Cooling was continued until the inside temperature of the mixer was 70° F., whereupon the catalyst (2.4 lbs. of methanesulfonic acid in 6.5 lbs. of acetic acid) was added and the mixer was run. Over a period of approximately one hour the inside temperature of the mixer came to 110° F. which temperature was maintained until a smooth dope of desired viscosity was obtained. A slurry of 2.1 lbs. of sodium acetate in 14 lbs. of acetic acid was mixed in. The jacket temperature of the mixer was lowered to 20° F. and sufficient 100% isopropanol was added thereto to fill the mixer (approximately 250 lbs. of isopropanol). The mixer was run until a fairly fine precipitate was formed. The precipitate was washed with 10 changes of 87% isopropanol, stabilized with urea, and dried at 120° F. The product analyzed as follows: apparent acetyl 28.5%, combined sulfur 6.4%, sodium sulfate 0.6%, nitrogen (as urea) 1.2%.

EXAMPLE 2

A sulfating mixture was prepared by slowly adding 7 parts of 95% sulfuric acid to 20 parts of acetic anhydride, with the temperature being kept below 25° C. during the entire addition, and then adding 6 parts of anhydrous sodium acetate with continued stirring and limited temperature until it had completely dissolved. Seventeen parts of ethyl cellulose (45% ethoxyl) was dissolved in 80 parts of glacial acetic acid, warmed to 40° C. and the sulfating mixture was added thereto. The mass was stirred for 10 minutes and was then cooled to room temperature. The cellulose ether sulfate obtained was precipitated by pouring the mass into anhydrous isopropanol, the isopropanol being at least equal in volume to the reaction mass. The precipitate was then washed with isopropanol and was dried. The product obtained had an inorganic salt content of less than 1% and a sulfur content of 3.8%.

The products prepared by procedures in accordance with my invention are useful for the preparation of sheeting or films for packaging dyes, detergents and such like as may be added in home laundering operations. The cellulose acetate sodium sulfate or the like being water soluble releases the material packaged therein into the aqueous bath into which it has been dropped.

In Example 1, above, instead of precipitating in anhydrous isopropanol, the low salt content products in the solution in the reaction mass may be recovered by adding substantially anhydrous isopropanol to the mass in a proportion of at least one part isopropanol to one part alkali metal salt of acyl sulfuric acid in the reaction medium; the cellulose product may then be precipitated therefrom by using sufficient 85% isopropanol (containing about 15% water) to cause the precipitation. Note that because of their high solubility in water, some cellulose ester or ether sulfates must be precipitated using substantially anhydrous isopropanol (rather than 85% isopropanol) for the entire precipitation step. By proceeding in this manner a product substantially free of inorganic salts is obtained.

In the making of cellulose propionate sulfates, cellulose acetate propionate sulfate, cellulose acetate butyrate sulfate and the like, it is to be understood that the corresponding acyl such as propionyl or butyryl will be present in the esterification mixture used in the form of their anhydrides, or when other anhydrides are present, in the form of the acids.

The invention has been described in considerable detail with particular reference to certain preferred embodiments thereof, but it will be understood that variations and modifications can be effected within the spirit and scope of the invention as described hereinabove, and as defined in the appended claims.

I claim:

1. A process for manufacturing a cellulose sulfate selected from the group consisting of cellulose ether and cellulose ester sulfates substantially free of inorganic salts, which process comprises:
    (a) reacting together a cellulosic material selected from the group consisting of cellulose, cellulose ethers, and cellulose esters with sulfuric acid in a reaction medium containing said cellulosic material, a fatty acid anhydride, sulfuric acid, alkali metal sulfate and weak esterification catalyst, under anhydrous conditions, to thereby produce a cellulose sulfate product, said cellulose sulfate product being soluble in said reaction medium;
    (b) upon completion of the formation of said cellulose sulfate product in said reaction medium, while said reaction medium is maintained in the anhydrous condition, blending substantially anhydrous isopropanol into said reaction medium in an amount at least equimolar to the amount of alkali metal salt of acyl sulfuric acid in said reaction medium; and
    (c) subsequently blending into the resulting mixture sufficient additional isopropanol containing from zero to about 15 percent water to precipitate said cellulose sulfate product.

2. A process as in claim 1 wherein said cellulosic material is cellulose.

3. A process as in claim 1 wherein said cellulosic material is a cellulose ether.

4. A process as in claim 1 wherein said cellulosic material is a cellulose ester.

5. A process as in claim 4 wherein said cellulose ester is cellulose acetate.

6. A process as in claim 1 wherein substantially anhydrous isopropanol is used to precipitate said cellulose sulfate product.

7. A process as in claim 3 wherein anhydrous isopropanol is used to precipitate the resulting cellulose ether sulfate.

8. A process as in claim 7 wherein said cellulose ether sulfate is ethyl cellulose sulfate.

(References on following page)

References Cited

UNITED STATES PATENTS

| | | | |
|---|---|---|---|
| 2,582,009 | 1/1952 | Crane | 260—215 |
| 3,075,962 | 1/1963 | Hiatt et al. | 260—215 |
| 3,075,963 | 1/1963 | Hiatt et al. | 260—215 |
| 3,075,964 | 1/1963 | Malm et al. | 260—215 |
| 3,098,007 | 4/1963 | Touey et al. | 260—215 |

DONALD E. CZAJA, Primary Examiner
R. W. GRIFFIN, Assistant Examiner

U.S. Cl. X.R.

106—169, 198; 260—212, 231